United States Patent [19]

Yoshitake et al.

[11] Patent Number: 4,638,374
[45] Date of Patent: Jan. 20, 1987

[54] DEFECT DETECTING APPARATUS FOR A ROTARY RECORDING MEDIUM

[75] Inventors: Yuji Yoshitake, Fujisawa; Kentaro Yokouchi, Yokosuka; Hiroyoshi Yoshikawa, Zama, all of Japan

[73] Assignee: Victor Company of Japan, Ltd., Japan

[21] Appl. No.: 620,803

[22] Filed: Jun. 14, 1984

[30] Foreign Application Priority Data

Jun. 16, 1983 [JP] Japan .................. 58-108882

[51] Int. Cl.⁴ .................. H04N 5/781; H04N 5/94
[52] U.S. Cl. .................. 358/336; 369/58
[58] Field of Search .................. 358/314, 336; 369/53, 369/54, 58

[56] References Cited

U.S. PATENT DOCUMENTS 4,031,546 6/1977 Leedom .................. 369/126
4,250,521 2/1981 Wright .................. 358/21 R

FOREIGN PATENT DOCUMENTS 3129830 4/1982 Fed. Rep. of Germany .
3214370 10/1982 Fed. Rep. of Germany .

Primary Examiner—Robert L. Richardson

Attorney, Agent, or Firm—Andrus, Sceales, Starke & Sawall

[57] ABSTRACT

A defect detecting apparatus for a disc comprises a first dropout selecting circuit for producing a first dropout detection signal having a predetermined pulse width in accordance with the human eyesight, a second dropout selecting circuit for producing a second dropout detection signal which is obtained by detecting a dropout in a vicinity of a beginning of a reproduced vertical synchronizing signal, an angle detecting circuit for generating an angle detection signal indicative of angular positions on the disc where the first and second dropout detection signals are generated with respect to a reference position which is related to the reference signal, a clog detecting circuit for generating a clog detection signal, a compensating circuit for compensating a value of an address signal which is separated from a signal which is reproduced from the disc in a reproducing apparatus, a processing circuit for performing a first process of discriminating the existence of a tracking error, a second process of discriminating an existence of a clog, and a third process of discriminating the existence of an interval in which a dropout exists, and at least an output device for storing or displaying a processed result from the processing circuit.

6 Claims, 44 Drawing Figures

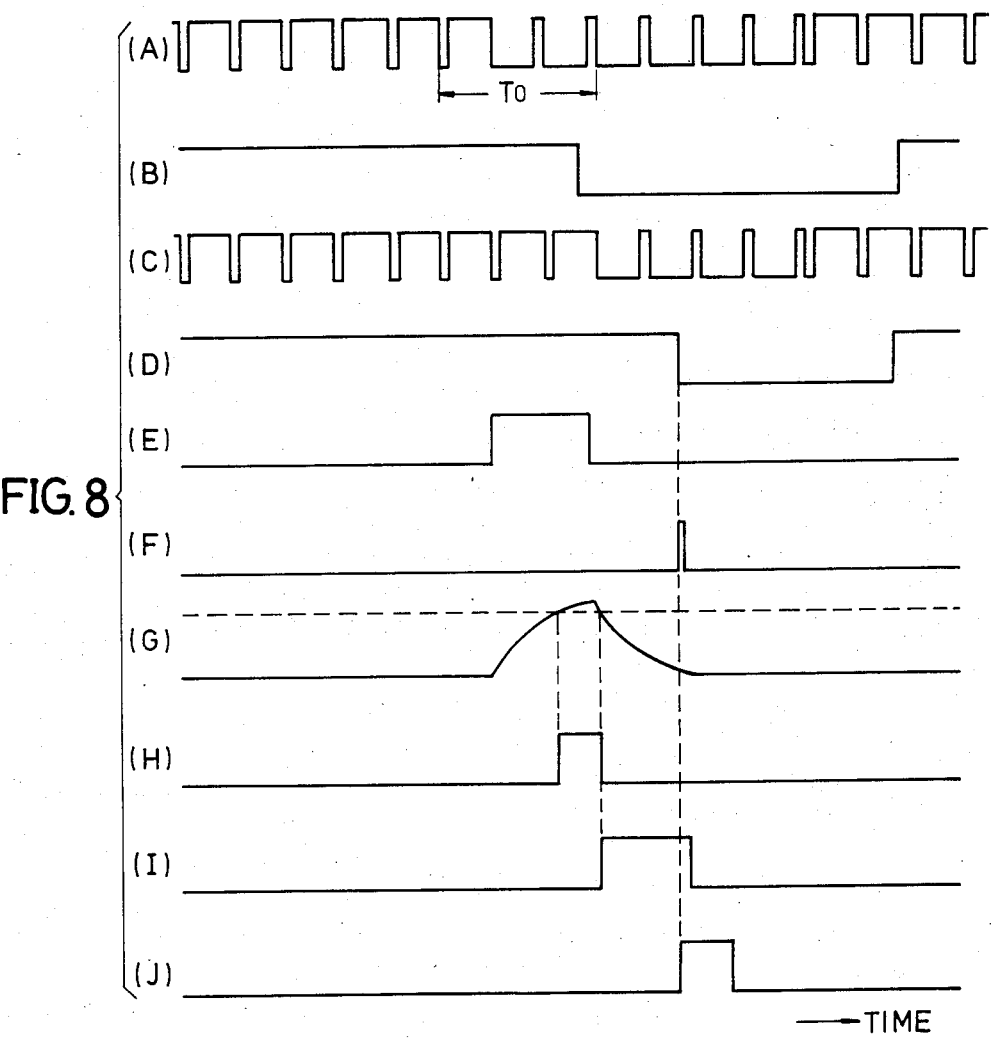

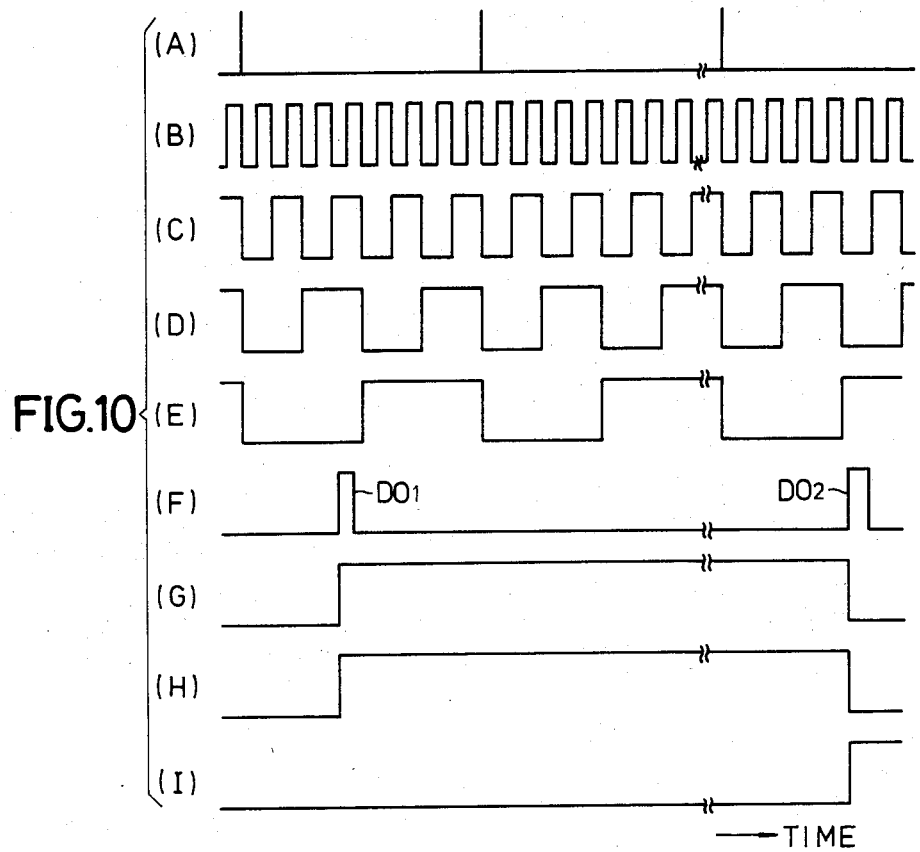
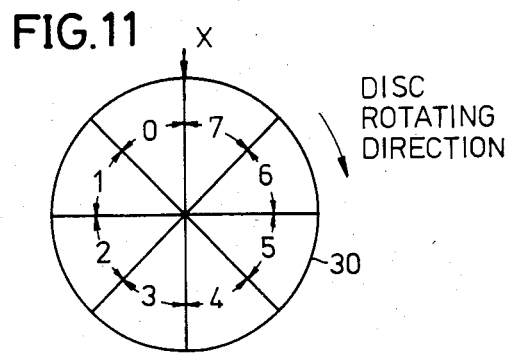

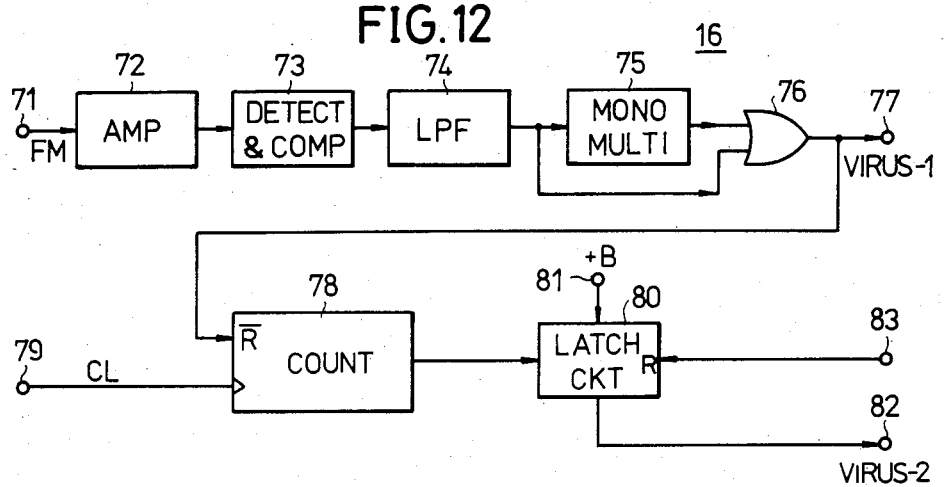
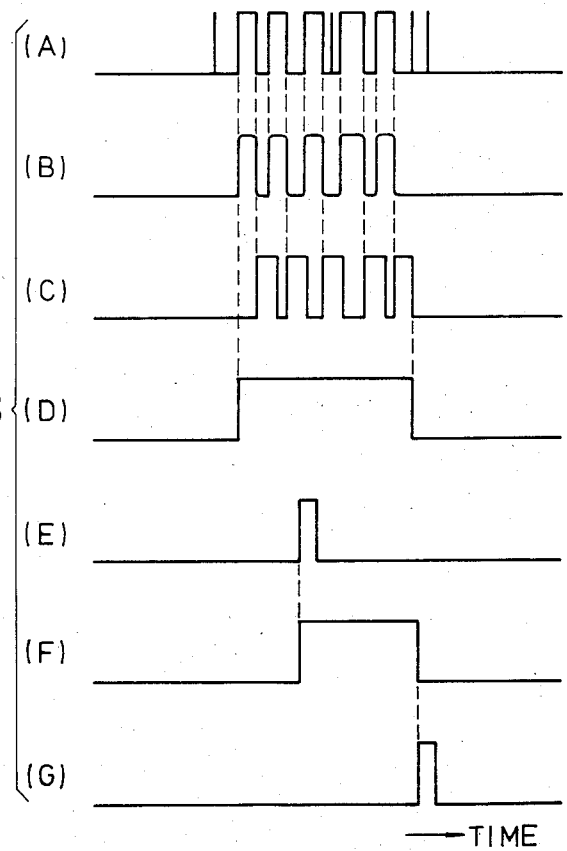

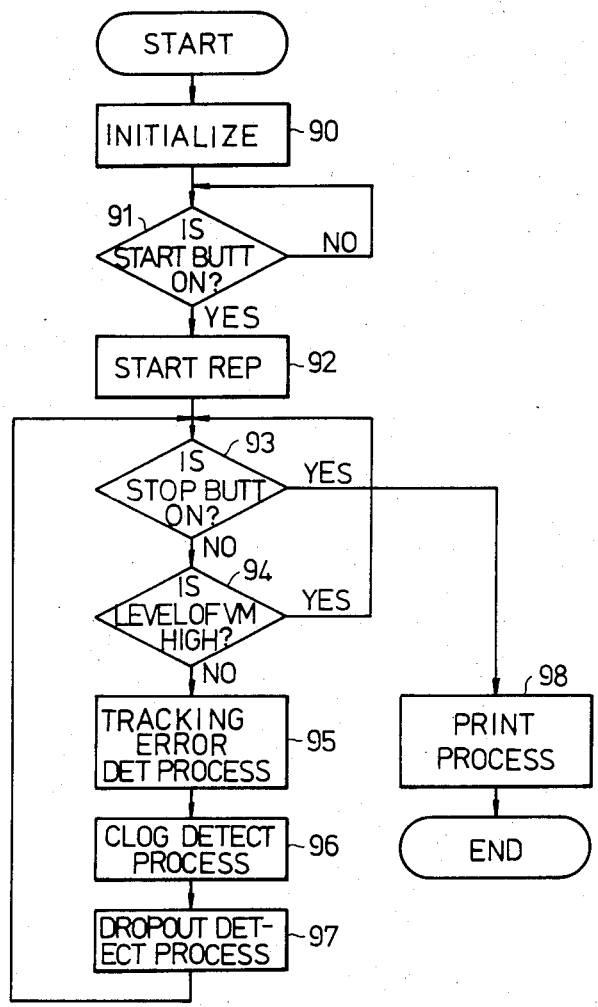

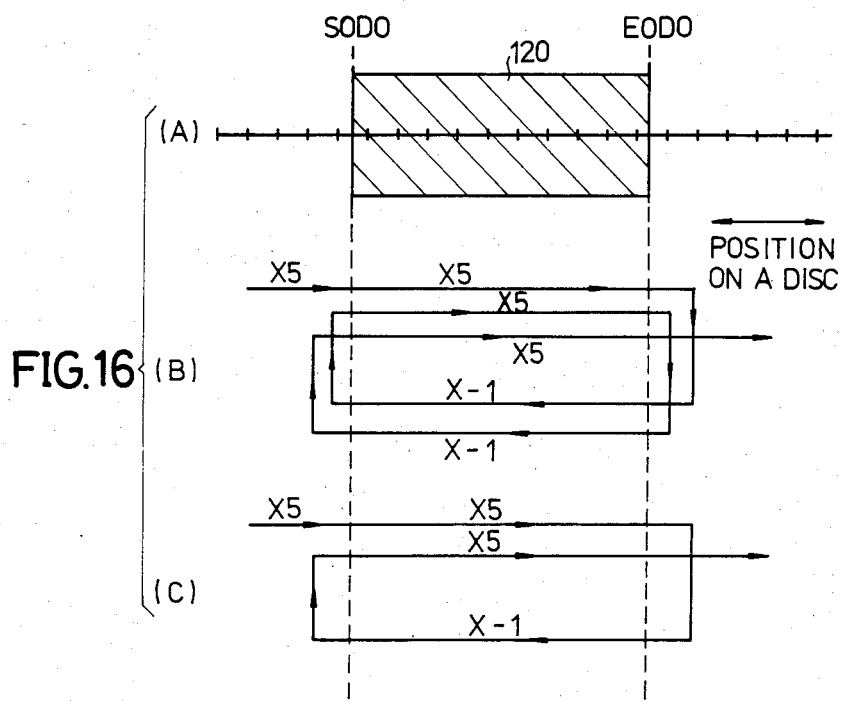

DEFECT DETECTING APPARATUS FOR A ROTARY RECORDING MEDIUM

BACKGROUND OF THE INVENTION

The present invention generally relates to defect detecting apparatuses for rotary recording mediums, and more particularly to a defect detecting apparatus for detecting defects such as a scratch, stain, dirt, deformed convex portion, deformed concave portion, or the like on a recording surface of a rotary recording medium which has information signals recorded on a spiral track as variations in geometrical configuration.

A rotary recording medium (hereinafter simply referred to as a disc) on which analog information signals such as a composite video signal and an audio signal are frequency-modulated and recorded on a spiral track or concentric tracks as variations in geometrical configuration such as rows of intermittent pits, is known. When manufacturing such a disc, a deformed convex portion which rises from the disc surface and a deformed concave portion which sinks from the disc surface, are sometimes formed on the disc surface during the manufacturing process. In addition, a stain, dust particle, dirt, or the like may adhere on the disc surface and cover the pits during the manufacturing process, and make the disc defective.

In a reproducing apparatus which reproduces pre-recorded information signals from the disc as variations in electrostatic capacitance between the disc and an electrode of a reproducing stylus which slides over the disc surface, the reproducing stylus may undergo an unwanted irregular movement when the disc has the defects described above. When the reproducing stylus slides over the deformed convex portion, for example, the reproducing stylus jumps upwardly at the deformed convex portion and bounces for a predetermined time before making smooth contact with the disc surface. While the reproducing stylus is separated from the disc surface, the pre-recorded information signals cannot be reproduced from the disc, and a dropout occurs in the reproduced signal. In addition, the reproducing stylus may jump in the track width direction at the deformed convex portion, and in this case, the reproducing stylus will scan over the wrong track and introduce a tracking error. A dropout similarly occurs in the reproduced signal when the reproducing stylus scans over the deformed concave portion, scratched portion, and portion with stain or dirt, and it is impossible to obtain a reproduced picture of a high quality in such cases.

Hence, the defects of the disc were conventionally detected in the disc manufacturing plant. According to a conventional method of detecting defects of the disc, the pre-recorded information signals (at least including the composite video signal) were picked up and reproduced by the reproducing stylus, and were then supplied to a monitoring receiver through a known reproducing circuit system. An inspector monitored the picture on the monitor receiver, and judged that a defect existed on the disc when a disturbance occurred in the picture which was being monitored.

However, according to the conventional defect detecting method, it was the limit for one inspector to simultaneously monitor two monitoring receivers. Further, it took approximately ½ the normal reproducing time of the disc to carry out the defect detection with respect to one disc. Moreover, because the defect detection was carried out by a person, it was possible for the person to miss a disturbance in the picture, and the standard for the defect detection differed according to the individual. As a result, there was a problem in that the reliability of the defect detection was poor due to the dependence on the inspector.

When a slightly deformed convex portion exists on the disc surface, such a slightly deformed convex portion may be scraped off as the reproducing stylus scans over this slightly deformed convex portion. In this case, the slightly deformed convex portion will no longer exist on the disc surface after it is scraped off by the reproducing stylus, and the defective disc will turn out to be an acceptable disc. However, such a defective disc was simply detected as being a defective disc according to the conventional defect detecting method, because the disc was played for the first time. In other words, since a dropout occurred in the reproduced signal when the reproducing stylus scanned over the slightly deformed convex portion while scraping off this slightly deformed convex portion, the disc was simply detected as being a defective disc even though the disc would have been detected as being acceptable if the disc was played for the second time.

SUMMARY OF THE INVENTION

Accordingly, it is a general object of the present invention to provide a novel and useful defect detecting apparatus for a disc in which the problems described heretofore have been eliminated.

Another and more specific object of the present invention is to provide a dropout detecting apparatus for a disc, which comprises a first dropout selecting circuit, a second dropout selecting circuit, a generating circuit for generating an angle detection signal, and a processing means. A dropout detection signal which is produced by detecting a decrease in the amplitude of a signal which is reproduced from a disc in a reproducing apparatus, is supplied to the first dropout selecting circuit. The first dropout selecting circuit produces a first dropout detection signal having a predetermined pulse width, responsive to one or a plurality of dropout detection signals which are received within a predetermined duration in which the dropouts can be visually considered as being one dropout. A reproduced vertical synchronizing signal and the dropout detection signal from the reproducing apparatus, are supplied to the second dropout selecting circuit. The second dropout selecting circuit produces a second dropout detection signal by selecting the dropout detection signal which was generated with a phase in the vicinity of a beginning of the reproduced vertical synchronizing signal and causes a horizontal sway in the picture or a running in the picture. The generating circuit generates the angle detection signal which is indicative of at least a section in which the dropout is generated, based on the first and second dropout detection signals. The processing means receives the output signal of the generating circuit and the first and second dropout detection signals, and discriminates the existence of a dropout.

According to the apparatus of the present invention, it is possible to detect dropouts which are visually conspicuous from among the dropouts, and it is therefore possible to detect only those discs which generate the visually conspicuous dropouts. The defect detection according to the present invention is in conformance with the human eyesight. In addition, the positions where the dropouts are generated, are detected in terms of an angle on the disc. Hence, when the defects exist extensively in one part of the disc, it is possible to check the stamper, the original disc, or the like so as to remove the cause of the defects.

Still another object of the present invention is to provide a defect detecting apparatus for a disc, which automatically controls the reproducing mode of the reproducing apparatus, and supplies the generation time and the continuation time of defects as lists to output devices responsive to signals from the reproducing apparatus. The defects include a dropout which is selectively detected according to the continuation time of the dropout, a clog, a tracking error which is obtained by comparing a reproduced address signal with real time, or the like. The clog includes dust particles or the like which adhere on the disc during the disc manufacturing process, dust particles or the like which adhere on the disc after the disc is manufactured, and dust particles or the like which adhere on a reproducing stylus. According to the apparatus of the present invention, the defects can be positively detected, and the reliability of the defect detection is improved because the standard of the defect detection is maintained constant. Further, it is possible to make the reproducing speed to five times the normal reproducing speed, for example, since the defect detection is performed automatically. As a result, the time required to detect the defects in one disc is considerably reduced compared to the conventional defect detecting method. In addition, it is possible for one inspector to simultaneously detect the defects in ten or more discs by use of the output devices.

A further object of the present invention is to provide a defect detecting apparatus for a disc, which comprises a processing means for storing starting and end positions of a section on an electrostatic capacitance type disc in which the dropout is generated, and for controlling the reproducing apparatus to carry out a backward reproduction with respect to this section and then to carry out a forward reproduction with respect to this section for the second time, so as to detect the first or second dropout detection signal. When at least one of the first and second dropout detection signals is detected during the forward reproduction of the section for the second time, the processing means controls the reproducing apparatus to again carry out the sequence of operations in which the same section is reproduced by the backward reproduction for the second time and is then reproduced by the forward reproduction for the third time. When at least one of the first and second dropout detection signals is detected during the forward reproduction of the section for the third time, the processing means discriminates that the disc is defective. According to the apparatus of the present invention, a slightly deformed convex portion on the disc can be scraped off during the backward reproduction, and approximately 55% of the discs which were detected as being defective according to the conventional defect detecting method can be detected as being acceptable. Moreover, essentially all of the discs which are detected as being defective by the apparatus according to the present invention are completely defective discs, and it is possible to considerably improve the reliability of the defect detection when compared with the conventional defect detecting method.

Other objects and further features of the present invention will be apparent from the following detailed description when read in conjunction with the accompanying drawings.

BRIEF DESCRIPTION OF THE DRAWINGS

FIGS. 8(A) through 8(J) show signal waveforms for explaining the operation of the circuit shown in FIG. 7;

FIGS. 10(A) through 10(I) show signal waveforms for explaining the operation of the circuit system shown in FIG. 9;

FIG. 11 is a diagram for explaining the relationship between the disc and the value of a counted signal;

FIG. 12 is a systematic circuit diagram showing embodiment of a clog detecting circuit in the circuit system shown in FIG. 1;

FIGS. 13(A) through 13(G) show signal waveforms for explaining the operation of the circuit system shown in FIG. 12;

FIG. 14 is a flow chart for explaining the operation of a main CPU in the circuit system shown in FIG. 1;

FIGS. 16(A) through 16(C) are diagrams for explaining an example of the operation of the defect detecting apparatus according to the present invention.

DETAILED DESCRIPTION

Figure 1:
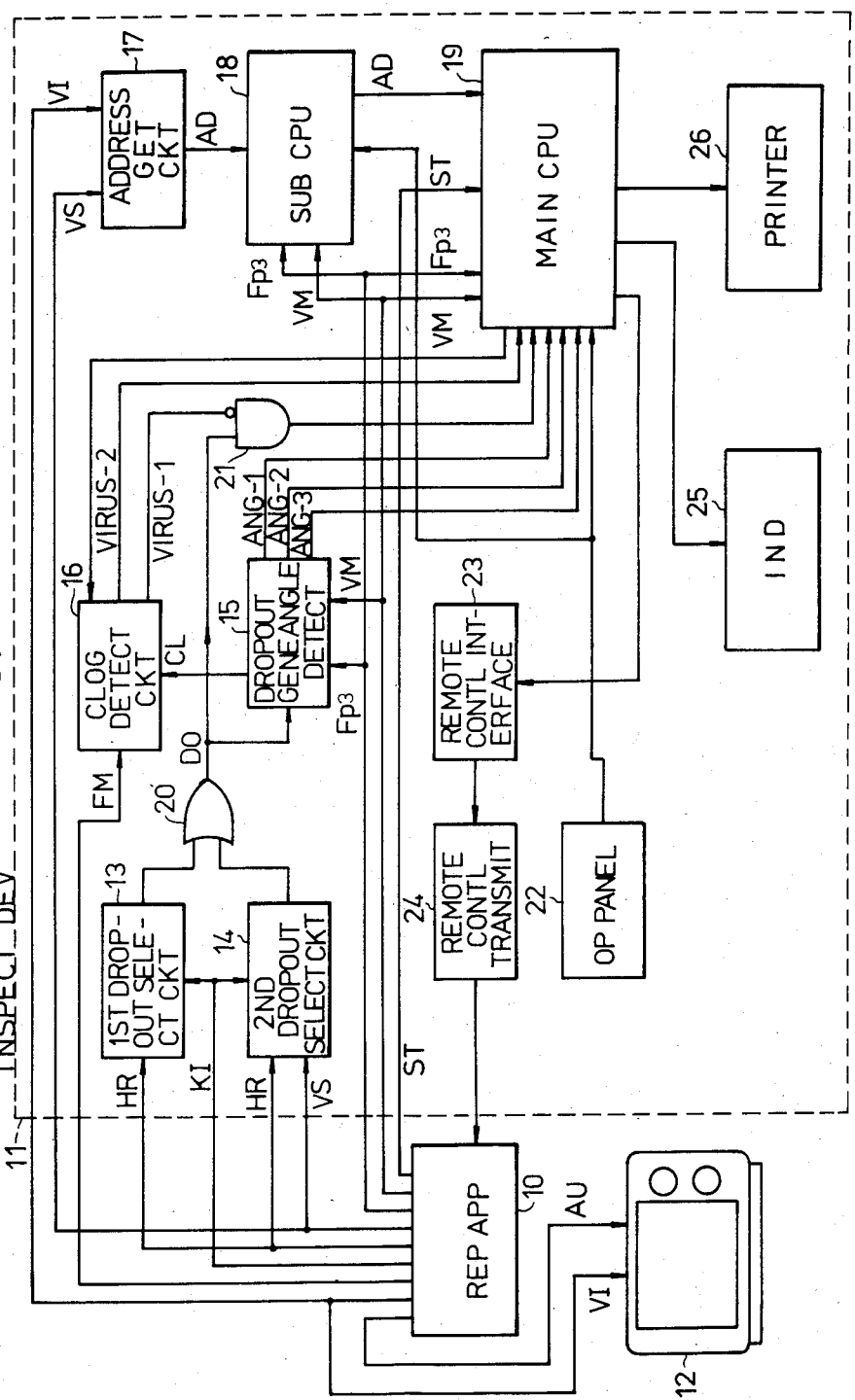
FIG. 1 is a systematic circuit diagram showing an embodiment of a defect detecting apparatus according to the present invention.

In FIG. 1, a reproducing apparatus 10 is identical to a reproducing apparatus of a color video signal recording and reproducing system previously proposed in a U.S. Pat. No. 4,208,671 in which the assignee is the same as the assignee of the present application, for example. The reproducing apparatus and a disc which is to be played on the reproducing apparatus, are known as disclosed in the specification and drawings of the above U.S. patent. Accordingly, the description on the reproducing apparatus will be omitted, and only a brief description will be given with respect to the disc. A color video signal which is to be recorded on the disc, is separated into a luminance signal and a carrier chrominance signal. The separated carrier chrominance signal is frequency-converted into a low frequency range, and is thereafter band-share-multiplexed with the separated luminance signal which has been band limited. The band-share-multiplexed signal is frequency-modulated, and is then frequency-division-multiplexed with two channels of frequency modulated audio signals which have been frequency-modulated independently, and with an address signal. The frequency-division-multiplexed signal is frequency-modulated, and is then multiplexed with a third reference signal fp3 which will be described later on in the specification. On the other hand, first and second reference signals fp1 and fp2 for tracking control, are produced independently.

Figure 2:
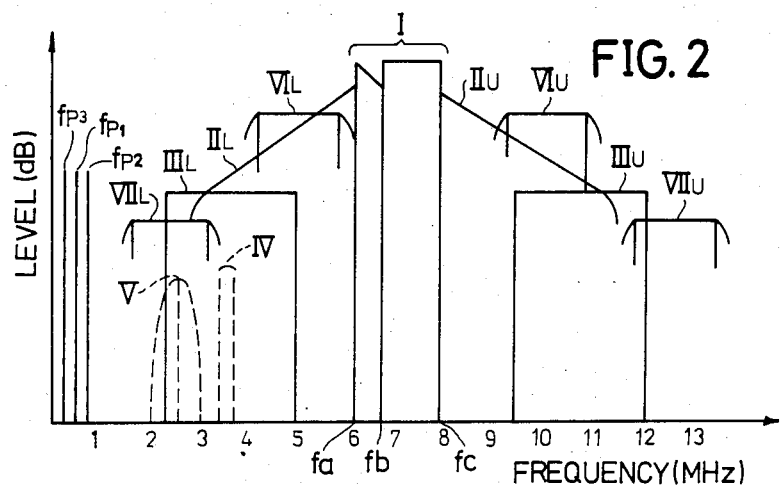
FIG. 2 shows an example of frequency spectrums of signals which are to be recorded on a disc.

FIG. 2 shows an example of frequency spectrums of signals which are to be recorded on the disc. In FIG. 2, a band I represents a carrier deviation band of 2.3 MHz of the frequency modulated luminance signal. A frequency $f_a$ represents a frequency of 6.1 MHz which corresponds to the synchronizing tip, a frequency $f_b$ represents a frequency of 6.6 MHz which corresponds to the pedestal, and a frequency $f_c$ represents a frequency of 7.9 MHz which corresponds to the white peak. Bands $II_U$ and $II_L$ respectively represent upper and lower sidebands of the frequency modulated luminance signal, and bands $III_U$ and $III_L$ respectively represent upper and lower side bands of signals which are obtained by frequency-modulating the two channels of frequency modulated audio signals $f_{A1}$ and $f_{A2}$. Carriers of the frequency modulated audio signals $f_{A1}$ and $f_{A2}$, which respectively have frequencies of 3.43 MHz and 3.73 MHz, are indicated by a reference character IV. A band V represents the band of the carrier chrominance signal which has been frequency-converted into the low frequency range. In addition, when this frequency converted carrier chrominance signal is frequency-modulated, first sidebands $VI_U$ and $VI_L$ and seconds sidebands $VII_U$ and $VII_L$ are obtained. In FIG. 2, the frequency spectrums which are indicated by solid lines, represent the signals which are recorded on the disc.

The reference signals fp1, fp2, and fp3 are located in an unoccupied band below the band $VII_L$. The occupying band of the reference signals fp1 through fp3 and the occupying band of the information signals are separated, because these signals must be picked up and reproduced by the same reproducing stylus.

The frequency modulated signals indicated by the solid lines in FIG. 2 and the third reference signal fp3 are converted into a first modulated laser beam, and a time-sequentially superimposed signal of the first and second reference signals fp1 and fp2 is converted into a second modulated laser beam. The first and second modulated laser beams are simultaneously converged on an original recording disc which is coated with a photosensitive agent, with a separation in the range of ½ the track pitch. The original recording disc is subjected to a known developing process, and then to a known disc manufacturing process. As a result, a disc which has an electrode function, has no stylus guide groove, and has a track pattern shown in FIG. 3, is obtained.

Figure 3:
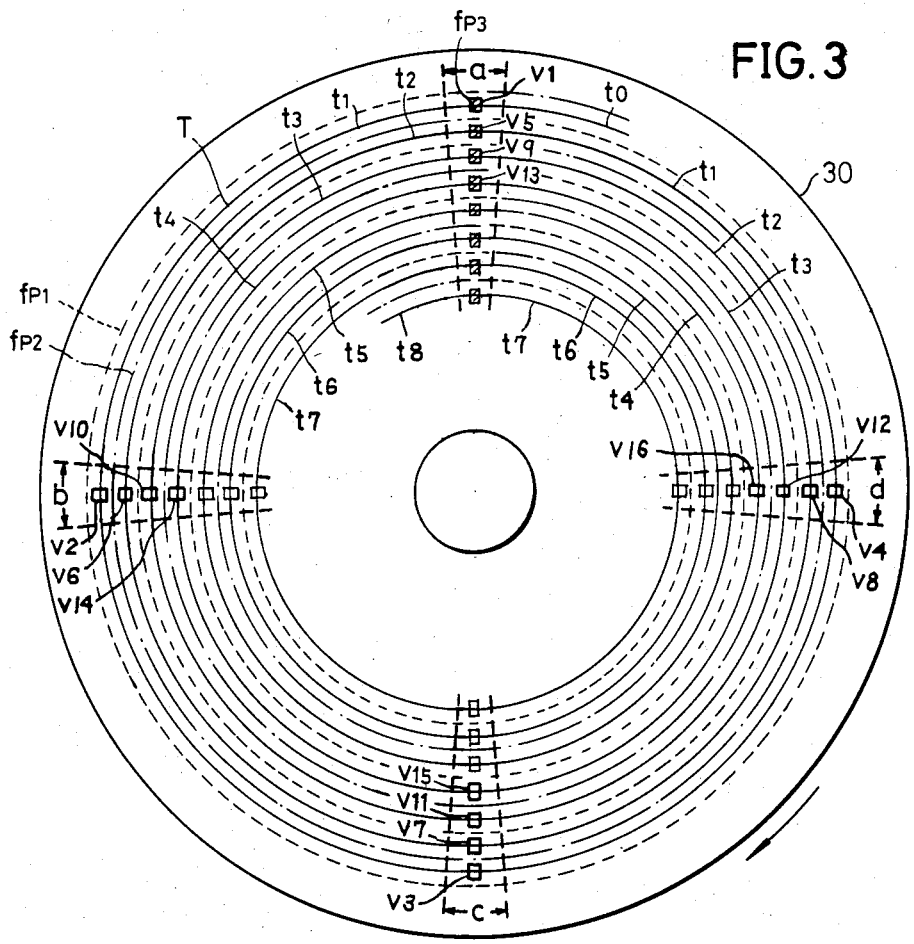
FIG. 3 shows an example of a track pattern formed on the disc.

In FIG. 3, the frequency modulated signals and the reference signal fp3 are recorded on a spiral track T on a disc 30, as row of intermittent pits according to the information contents. In the single and continuous spiral track T which is indicated by a solid line in FIG. 3, each track turn of the disc 30 is represented by t1, t2, t3, . . . . Each track turn is formed with pits of the information signal on the flat surface of the disc 30, and no guide groove is formed for guiding the reproducing stylus. With respect to one track turn, pits of the first reference signal fp1 and pits of the second reference signal fp2 are respectively formed on both sides thereof along the longitudinal direction of the track for every one horizontal scanning period (1H), at positions corresponding to the horizontal blanking period.

Pits of only one of the reference signals fp1 and fp2 are formed at an intermediate position between center lines of adjacent track turns. Moreover, with respect to one track turn, the sides on which the reference signals fp1 and fp2 are recorded, are interchanged for each track turn. In other words, the tracks of the first reference signal fp1 are represented by phantom lines, and the tracks of the second reference signal fp2 are represented by a one-dot chain lines. Positions where the vertical synchronizing signal is recorded in each field, are represented by $V_1$, $V_2$, $V_3$, . . . . Furthermore, the third reference signal fp3 is recorded for a duration of approximately 3H, for example, at the starting positions of the track turns t1, t2, t3, . . ., that is, at the positions $V_1$, $V_5$, $V_9$, . . . where the sides on which the reference signals fp1 and fp2 are recorded interchange.

In addition, one revolution period of the disc 30 is equal to a duration of four fields of the video signal, for example. The vertical blanking period is recorded on the track turns t1, t2, t3, . . . within ranges which are represented by a, b, c, and d.

Figure 4:
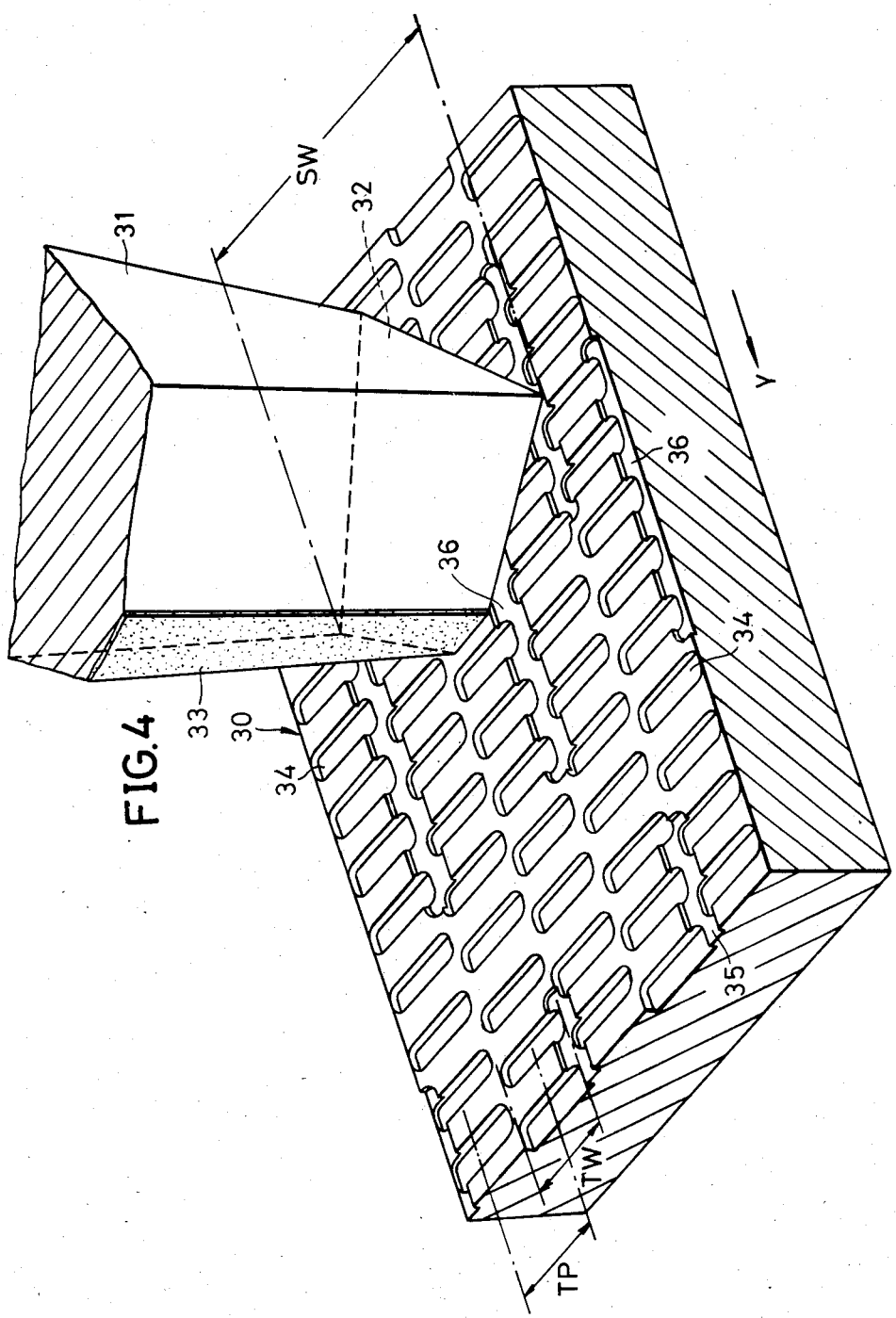
FIG. 4 is a perspective view showing an example of a sliding state between the disc and a reproducing stylus.

FIG. 4 shows a state where a reproducing stylus 31 is scanning over the recording surface of the disc 30 having the track pattern described before. A bottom surface 32 of the reproducing stylus 31 has a portion with a maximum width SW which is greater than the track pitch TP. An electrode 33 having a thickness of 500Å to 3000Å, for example, is adhered onto the rear surface of the reproducing stylus 31. As the disc 30 rotates in the direction of an arrow Y, the reproducing stylus 31 relatively scans over the recording surface of the disc 30, and the electrostatic capacitance between the electrode 33 and the disc 30 varies responsive to a width TW of pits 34. As a result, the contents of the information signals which are recorded by the pits 34, are reproduced as the variations in the electrostatic capacitance between the electrode 33 and the disc 30.

The reference signals fp1 and fp2 which are recorded by pits 35 and 36, are also reproduced by the electrode 33. When the center of the electrode 33 deviates from the center line of the track, a difference is introduced between the levels of the reference signals which are reproduced, and a known tracking control is carried out responsive to this level difference.

Returning now to the description of the circuit system shown in FIG. 1, the operation of the reproducing apparatus 10 is controlled responsive to a control signal from an inspecting device 11 which will be described later on in the specification. The reproducing apparatus 10 reproduces the pre-recorded signals from the disc 30 which is to be inspected. Thus, the reproducing apparatus 10 reproduces a frequency division multiplexed signal FM having the frequency spectrums indicated by the solid lines in FIG. 2, and frequency-demodulates the frequency modulated signals in this reproduced signal FM, excluding the reference signals fp1 through fp3. The reproducing apparatus 10 thereafter carries out a signal processing which is complementary to the signal processing carried out at the time of the recording, and obtains a reproduced color video signal VI of a predetermined television system and a reproduced audio signal AU. The reproducing apparatus 10 also carries out a tracking control based on the reproduced reference signals fp1 through fp3 which are discriminated and separated from the reproduced signal FM, as disclosed in the U.S. Pat. No. 4,208,671 described before and in U.S. Pat. Nos. 4,408,312 and 4,429,335, for example. A tracking control circuit within the reproducing apparatus 10, has a circuit part for producing a reproduced reference signal Fp3 which is in phase with the reference signal fp3 and has a constant period even when a dropout occurs, based on the reference signal fp3. The tracking control circuit also has a circuit part for generating a kick pulse KI which is supplied to a tracking coil when the reproducing stylus 31 is to be forcibly kicked over one track pitch.

A dropout compensation circuit is also provided within the reproducing apparatus 10. The dropout compensation circuit produces a dropout detection signal HR having a pulse width corresponding to a duration of a dropout which is detected based on the reproduced signal FM. For the duration in which the dropout detection signal HR is produced, the reproduced signals are replaced by signals such as a reproduced luminance signal and a reproduced carrier chrominance signal which are obtained from a delay circuit and are signals of one horizontal scanning period (1H) before the time when the dropout occurred. As a method of detecting the dropout, there are two dropout detecting methods. A first dropout detecting method detects a dropout when the level of an envelope of the reproduced signal FM becomes lower than a predetermined level, and a second dropout detecting method detects a dropout by converting the reproduced signal FM into a pulse train in a limiter and triggering a frequency deviation detector by the pulse train. The frequency deviation detector employed in the second dropout detecting method is triggered responsive to a leading edge of the incoming pulse, and repeats charging and discharging operations. However, when this frequency deviation detector is not triggered for over a predetermined time, the dropout detection signal HR is produced until the next triggering pulse is received.

The reproducing apparatus 10 also generates a video muting signal VM for blocking the transmission of the reproduced color video signal VI. The video muting signal VM assumes a predetermined logical value when the reproducing stylus 31 is scanning in a lead-in section and a lead-out section on the disc 30. A status signal (status word) ST is generated from a microcomputer within the reproducing apparatus 10. This status signal ST indicates the reproducing state of the reproducing apparatus 10. The status signal ST is actually made up of two signals, and enables discrimination of three reproducing states, that is, a normal-speed reproduction, a quintuple-speed reproduction, and a backward reproduction.

The reproducing apparatus 10 has nine external output terminals for independently transmitting a total of nine kinds of signals The eight kinds of signals FM, VI, AU, KI, Fp3, HR, VM, and ST described heretofore, and a vertical synchronizing signal VS which is separated from the reproduced color video signal VI, are the nine kinds of signals. Among the nine kinds of signals, the signals VI and AU are supplied to a monitoring receiver 12 to be monitored, and eight kinds of signals excluding the reproduced audio signal AU are supplied to the inspecting device 11.

Next, description will be given with respect to the inspecting device 11. The inspecting device 11 comprises a first dropout selecting circuit 13, a second dropout selecting circuit 14, a clog detecting circuit 16, a dropout generation angle detecting circuit 15, an address get circuit 17, a sub central processing unit (CPU) 18, a main CPU 19, and other circuits including input and output devices, which are selectively applied with the eight kinds of signals excluding the reproduced audio signal AU. The first dropout selecting circuit 13 selectively detects dropouts which appear in the reproduced picture, and produces a first dropout detection signal for a duration which is in accordance with the human eyesight. On the other hand, the second dropout selecting circuit 14 selectively detects dropouts which cause deviation from the synchronized state, and produces a second dropout detection signal.

Figure 5:
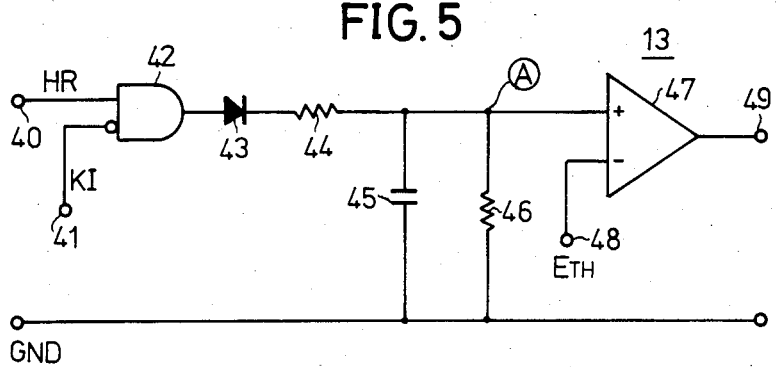
FIG. 5 is a circuit diagram showing an embodiment of a first dropout selecting circuit in the circuit system shown in FIG. 1.

The first dropout selecting circuit 13 has a circuit construction shown in FIG. 5. The dropout detection signal HR is applied to an input terminal 40, and the kick pulse KI is applied to an input terminal 41.

In a case where the reproducing stylus 31 scans over a deformed convex portion on the disc 30, for example, the reproducing stylus 31 vibrates vertically to the recording surface of the disc 30. The reproducing stylus 31 separates from the recording surface of the disc 30 a plurality of times due to the vertical vibration, and a plurality of dropouts occur. As a result, a plurality of intermittent dropout detection signals HR are generated within a finite duration. However, such dropouts will only be observed by the human eye as being a single disturbance in the picture. For this reason, the first dropout selecting circuit 13 integrates the dropout detection signals HR, and produces the first dropout detection signal which assumes a high level in a duration in which the dropout detection signals HR are generated intermittently, so that the first dropout detection signal is in accordance with the human eyesight. The dropout which occurs when the reproducing stylus 31 is kicked intentionally, is unrelated to the defect of the disc 30. Hence, the first dropout selecting circuit 13 stops detecting the dropout when the kick pulse KI is supplied thereto.

Figure 6:
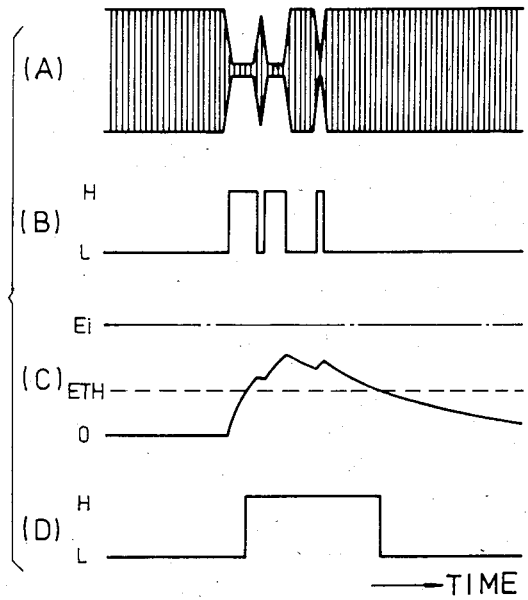
FIGS. 6(A) through 6(D) show signal waveforms for explaining the operation of the circuit shown in FIG. 5.

It will now be assumed that three dropouts occurred intermittently and within a short duration, in the reproduced signal FM as shown in FIG. 6(A). In this case, dropout detection signals HR shown in FIG. 6(B) are applied to one input terminal of a gate circuit 42, through the input terminal 40 shown in FIG. 5. The kick pulse KI from the input terminal 41 is applied to the other input terminal of the gate circuit 42, however, the level at the input terminal 41 is low when the reproducing stylus 31 is not being kicked. Accordingly, in this case, the dropout detection signals HR are supplied to a capacitor 45 through the gate circuit 42, a diode 43, and a resistor 44, and charges the capacitor 45. The capacitor 45 is coupled in parallel with a resistor 46. A common connection point Ⓐ among the resistor 44, the capacitor 45, and the resistor 46, is coupled to a non-inverting input terminal of a comparator 47. Thus, the capacitor 45 is charged with a charging time constant which is determined by a product of a resistance $R_1$ of the resistor 44 and a capacitance $C_1$ of the capacitor 45, and is discharged with a discharging time constant which is determined by a product of a resistance $R_2$ of the resistor 46 and the capacitance $C_1$. A relation $R_1 < < R_2$ exists between the two resistances, and the charging time constant is selected to be smaller than the discharging time constant.

It will be assumed that the reverse current of the diode 43 can be neglected and that a current flowing to the non-inverting input terminal of the comparator 47 can be neglected. In addition, a peak value of the dropout detection signal HR is represented by $E_i$, and a reference voltage which is applied to a non-inverting input terminal of the comparator 47 through an input terminal 48 is represented by $E_{TH}$, where $E_i$ is greater than $E_{TH}$. In this case, a time $t_a$ it takes for the voltage (terminal voltage of the capacitor 45) at the connection point Ⓐ to reach the reference voltage $E_{TH}$ after the dropout detection signal HR is received, can be described by the following equation (1).

$$t_a = -R_1 C_1 \ln(1 - E_{TH}/E_i) \quad (1)$$

In addition, a time $t_b$ it takes for the voltage at the connection point Ⓐ to decrease to the reference voltage $E_{TH}$ from the voltage $E_i$ due to the discharge of the capacitor 45, can be described by the following equation (2).

$$t_b = -R_2 C_1 \ln(E_{TH}/E_i) \quad (2)$$

Accordingly, when $C_1 = 0.18$ μF, $R_1 = 8.2$ kΩ, $R_2 = 82$ kΩ, and $E_{TH}/E_i = 5/24$, for example, the time $t_a$ is equal approximately equal to 340 μsec and the time $t_b$ is approximately equal to 23 msec.

The voltage at the connection point Ⓐ assumes a waveform indicated by a solid line in FIG. 6(C). Hence, one pulse shown in FIG. 6(D) is produced from the comparator 47, through an output terminal 49, as the first dropout detection signal.

Therefore, the plurality of intermittent dropouts which occur within the predetermined time (duration) $t_b$ and are only observed as a single dropout according to the human eye, is detected in the first dropout selecting circuit 13 as one dropout. Further, the first dropout selecting circuit 13 does not detect dropouts which only exist for an extremely short duration of less than the time (duration) $t_a$. The first dropout detection signal which is produced from the first dropout selecting circuit 13 in accordance with the human eyesight, is supplied to one input terminal of an OR circuit 20 shown in FIG. 1. When the kick pulse KI is applied to the input terminal 41, the output signal of the gate circuit 42 constantly assumes a low level, and the first dropout detection signal is not produced from the first dropout selecting circuit 13.

Figure 7:
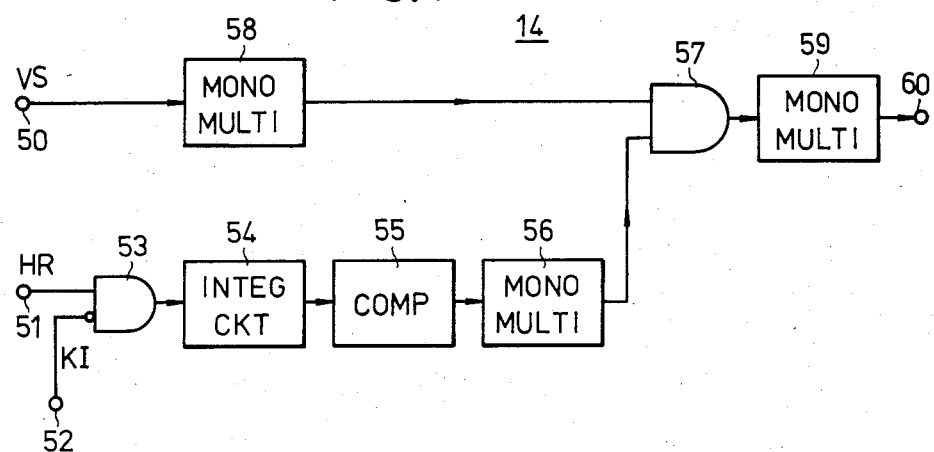
FIG. 7 is a circuit diagram showing an embodiment of a second dropout selecting circuit in the circuit system shown in FIG. 1.

The second dropout selecting circuit 14 has a circuit construction shown in FIG. 7, and the reproduced vertical synchronizing signal VS is applied to an input terminal 50. The dropout detection signal HR applied to an input terminal 51, and the kick pulse KI applied to an input terminal 52, are respectively supplied to a gate circuit 53. In a duration in which the kick pulse KI is not applied to the input terminal 52, the dropout detection signal HR is produced from the gate circuit 53 and is supplied to an integrating circuit 54. In the waveform of the reproduced color video signal VI within the vertical blanking period, it will be assumed that a dropout of approximately 40 μsec or more occurs within a duration $T_o$ as shown in FIG. 8(A). The duration $T_o$ corresponds to a total of 1.5H which is the sum of the first 1H of the vertical synchronizing pulse and 0.5H of the equalizing pulse which precedes this vertical synchronizing pulse. In this case, the dropout compensation circuit of the reproducing apparatus 10 replaces the signals within the duration $T_o$ with the signals of 1H before, but the phase of the vertical synchronizing signal will shift or the vertical synchronizing signal will be dropped out by such replacement, and a sway or a running will occur in the picture. Accordingly, such a disc should be discriminated as being a defective disc.

However, the first dropout selecting circuit 13 does not respond to the dropout detection signal HR which is shorter than the duration $t_a$ (340 μsec, for example), as described before. For this reason, the dropout detection signal HR of approximately 40 μsec or more which occurs within the duration $T_o$, will not be detected in the first dropout selecting circuit 13, similarly as in the case of the dropout detection signal HR of under 340 μsec which occurs at other durations and is also not detected. Hence, even when the dropout is a short dropout of approximately 40 μsec or more, this dropout needs to be detected if this dropout occurs within the duration $T_o$, and the second dropout selecting circuit 14 is provided within the inspecting device 11 for the purpose of producing the second dropout detection signal responsive to the dropout detection signal HR in such a case.

For example, when a part corresponding to the first 1H of the vertical synchronizing pulse is dropped out, the dropout compensation circuit of the reproducing apparatus 10 replaces this dropped out part with 1H of the reproduced color video signal which was obtained 1H before the dropout. The output signal waveform of the dropout compensation circuit becomes as shown in FIG. 8(C) wherein the dropped out part is replaced by the equalizing pulse of 1H before. Thus, although the reproduced vertical synchronizing signal should originally have the waveform shown in FIG. 8(B), the rising edge position of the waveform changes as shown in FIG. 8(D).

It will be assumed that the dropout detection signal HR obtained from the gate circuit 53, has been generated within the duration $T_o$ described before as shown in FIG. 8(E). The integrating circuit 54 integrates this dropout detection signal HR, and supplies to a comparator 55 a signal having a waveform shown in FIG. 8(G). The comparator 55 compares this signal from the integrating circuit 54 with a reference voltage indicated by a phantom line in FIG. 8(G). This reference voltage is selected to the maximum voltage obtained from the integrating circuit 54 when a pulse having a pulse width of 40 μsec is supplied to the integrating circuit 54. A pulse shown in FIG. 8(H) which is obtained from the comparator 55, is supplied to a monostable multivibrator 56 and triggers the monostable multivibrator 56 by a falling (trailing) edge thereof. As a result, a pulse shown in FIG. 8(I) having a pulse width of approximately 60 μsec, is produced from the monostable multivibrator 56 and is supplied to one input terminal of an AND circuit 57.

On the other hand, as a result of the dropout compensation carried out in the dropout compensation circuit within the reproducing apparatus 10, a reproduced vertical synchronizing signal VS shown in FIG. 8(D) having a falling edge at a position which differs from the regular position, is supplied to a monostable multivibrator 58. Thus, the monostable multivibrator 58 is triggered responsive to the falling edge (leading edge) of the reproduced vertical synchronizing signal VS shown in FIG. 8(D), and produces a pulse having a width of approximately 6.5 μsec as shown in FIG. 8(F). This pulse produced from the monostable multivibrator 58, is supplied to the other input terminal of the AND circuit 57. Hence, the AND circuit 57 produces the output pulse of the monostable multivibrator 58 generated within a duration in which the monostable multivibrator 56 produces a high-level gate signal, and supplies this output pulse to a monostable multivibrator 59. The monostable multivibrator 59 is triggered responsive to a rising (leading) edge of the pulse supplied thereto. Accordingly, the monostable multivibrator 59 produces a pulse shown in FIG. 8(J) having an arbitrary pulse width (in the order of 10 μsec, for example) which may be counted. The output pulse of the monostable multivibrator 59 is supplied to the other input terminal of the OR circuit 20 shown in FIG. 1, through an output terminal 60, as the second dropout detection signal.

The OR circuit takes the logical sum of the first and second dropout detection signals, and produces a dropout detection signal DO. This dropout detection signal DO is supplied to the dropout generation angle detecting circuit 15 and to a gate circuit 21. When the kick pulse KI is supplied to the second dropout selecting circuit 14, the output signal level of the gate circuit 53 is constantly low, and the second dropout selecting circuit 14 is put into a non-operating state.

Figure 9:
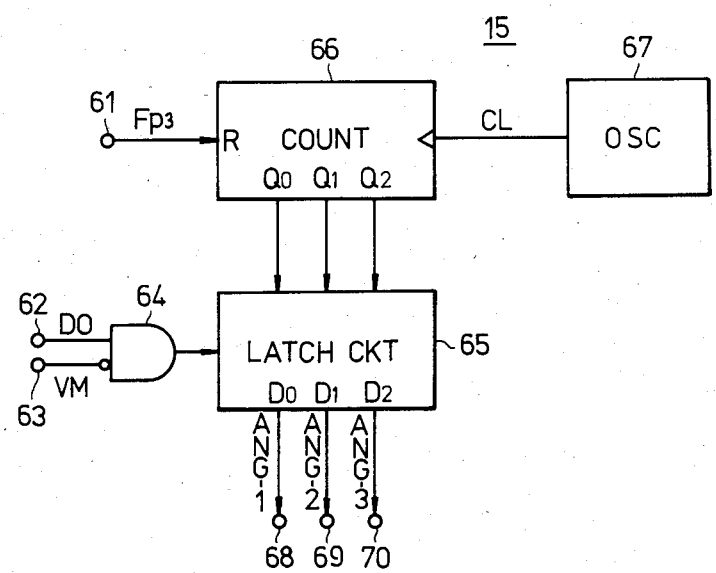
FIG. 9 is a systematic circuit diagram showing an embodiment of a dropout generation angle detecting circuit in the circuit system shown in FIG. 1.

Next, description will be given with respect to the dropout generation angle detecting circuit 15 shown in FIG. 1. The dropout generation angle detecting circuit 15 has a circuit construction shown in FIG. 9, and the reproduced reference signal Fp3 is applied to an input terminal 61. The dropout detection signal DO from the second dropout selecting circuit 14 is applied to an input terminal 62, and the video muting signal VM is applied to an input terminal 63. These signals DO and VM are supplied to a gate circuit 64. The video muting signal VM assumes a high level when the reproducing stylus 31 is located within the lead-in or lead-out section on the disc 30, and assumes a low level when the reproducing stylus 31 is located within a program recorded section on the disc 30. For this reason, the gate circuit 64 is open only when the reproducing stylus 31 is scanning over the program recorded section on the disc 30., so as to pass the dropout detection signal DO and supply this dropout detection signal DO to a latch circuit 65 as a latch pulse. On the other hand, the gate circuit 64 is closed when the reproducing stylus 31 scans over the lead-in or lead-out section on the disc 30, and puts the dropout generation angle detecting circuit 15 in a non-operating state. This is because no reproduced picture is obtained while the reproducing stylus 31 scans over the lead-in and lead-out sections on the disc 30, that is, because the defect detection need not be made with respect to these sections.

The reproduced reference signal Fp3 shown in FIG. 10(A) is applied to a reset terminal R of a counter 66, and a clock signal CL shown in FIG. 10(B) which is produced from an oscillator 67 is supplied to a counting input terminal of the counter 66. The clock signal CL is a square wave having a period of approximately 8.3 msec which is ⅛ the revolution period (approximately 1/15 second, for example) of the disc 30, for example. The counter 66 is an 8-count (or octal) counter having output terminals $Q_0$, $Q_1$, and $Q_2$. The counter 66 counts the pulses in the clock signal CL after being reset by the reproduced reference signal Fp3 which is applied to the reset terminal R thereof, and produces counted signals shown in FIGS. 10(C) through 10(E) through the respective output terminals $Q_0$ through $Q_2$. These counted signals are supplied to the latch circuit 65. Hence, as the disc 30 rotates clockwise, the counted signals indicate a value "0" in decimal in an angular range of 45° towards the counterclockwise direction from a position indicated by an arrow X where the reproduced reference signal Fp3 is detected, as shown in FIG. 11. And, the value indicated by the counted signals is incremented by "1" for every subsequent angular ranges of 45° as shown in FIG. 11. In an angular range of 45° towards the clockwise direction from the position X, the value indicated by the counted signals is "7" in decimal.

The latch circuit 65 latches the counted signals from the counter 66, at a point when the dropout detection signal DO shown in FIG. 10(F) rises, and produces angle detection signals ANG-1, ANG-2, and ANG-3 shown in FIGS. 10(G), 10(H), and 10(I) through respective output terminals $D_0$, $D_1$, and $D_2$ thereof. These angle detection signals ANG-1, ANG-2, and ANG-3 are obtained through respective output terminals 68, 69, and 70. Accordingly, in an interval between a time when the dropout detection signal $DO_1$ shown in FIG. 10(F) is obtained and a time when a dropout detection signal $DO_2$ is obtained, angle detection signals ANG-1, ANG-2, and ANG-3 indicating a value "3" in decimal are produced through the output terminals $D_0$ through $D_2$ of the latch circuit 65. In this case, it can be detected from the angle detection signals ANG-1, ANG-2, and ANG-3 that the dropout occurred in an angular range between an angular position which is 135° towards the counterclockwise direction from the position X and an angular position which is 180° towards the counterclockwise direction from the position X on the disc 30. From the time when the dropout detection signal $DO_2$ is generated, angle detection signals ANG-1, ANG-2, and ANG-3 indicating a value "4" in decimal are produced through the output terminals $D_0$ through $D_2$ of the latch circuit 65. In this case, it can be detected from the angle detection signals ANG-1, ANG-2, and ANG-3 that the dropout occurred in an angular range between the angular position which is 180° towards the counterclockwise direction from the position X and an angular position which is 225° towards the counterclock-wise direction from the position X on the disc 30. The angle detection signals ANG-1, ANG-2, and ANG-3 are supplied to the main CPU 19 shown in FIG. 1 through the respective output terminals 68 through 70, and are stored in the main CPU 19 together with the time (time address on the disc) when the dropout was generated and the duration of the dropout.

The position where the dropout was generated, is detected in terms of the angular position on the disc 30. Hence, when the dropouts occur extensively in the same part of a plurality of discs, it is possible to check the stamper, the original disc, or the like so as to locate and eliminate the cause of the dropouts. For this reason, the generation of defects on the discs may be reduced, and the percentage of manufacturing acceptable (satisfactory) discs as opposed to defective discs may be improved.

Next, description will be given with respect to the clog detecting circuit 16 shown in FIG. 1. The clog detecting circuit 16 has a circuit construction shown in FIG. 12.

Normally, the duration of a dropout which occurs due to a clog, including a clog on the disc and a clog on the reproducing stylus, is over 0.1 sec to 0.2 sec. However, the dropout detection signal HR which is produced from the reproducing apparatus 10 and is employed in the first and second dropout selecting circuits 13 and 14, is produced based on the level of the envelope of the reproduced signal FM which is detected after the level deviation in the entire reproduced signal FM is compensated in an automatic gain control circuit of the dropout compensation circuit. For this reason, the dropout due to clog which has a long duration, including the level deviation in the entire reproduced signal FM, cannot be detected in the first and second dropout selecting circuits 13 and 14. Accordingly, the clog detecting circuit 16 produces a dropout detection signal directly from the reproduced signal FM, and selects those dropout detection signals which correspond to a dropout of over 0.1 sec to 0.2 sec.

The reproduced frequency division multiplexed signal FM which is applied to an input terminal 71, is supplied to a detector and comparator circuit 73 through an amplifier 72. The detector and comparator circuit 73 detects the level of the envelope of the reproduced signal FM, and then compares the detected level with a small constant level. The detector and comparator circuit 73 produces a signal shown in FIG. 13(A) which assumes a high level when the detected level becomes less than the constant level. This signal produced from the detector and comparator circuit 73, is a dropout detection signal having a time width which corresponds to the duration of the dropout. A high-frequency component of the output signal of the detector and comparator circuit 73, having a pulse width of under 50 msec, for example, is eliminated in a lowpass filter 74. As a result, the lowpass filter 74 produces a signal shown in FIG. 13(B), and supplies this signal to a monostable multivibrator 75 so as to trigger the monostable multivibrator 75 responsive to a falling (trailing) edge thereof. The output signal of the lowpass filter 74 is also supplied to an OR circuit 76.

A pulse signal shown in FIG. 13(C) which is produced from the monostable multivibrator 75, is supplied to the OR circuit 76. As a result, the OR circuit 76 produces a first clog detection signal VIRUS-1 shown in FIG. 13(D) which continuously assumes a high level while the dropouts due to the clog are generated. This first clog detection signal VIRUS-1 is obtained through an output terminal 77, and is also supplied to a reset terminal R̄ of a counter 78. The clock signal CL shown in FIG. 9 which is produced from the oscillator 67, is supplied to a counter input terminal of the counter 78 through an input terminal 79. The counter 78 is in a reset state when the first clog detection signal VIRUS-1 assumes a low level, and the counted value is maintained at zero. When the first clog detection signal VIRUS-1 assumes a high level, the counter 78 no longer assumes the reset state, and counts the pulses in the clock signal CL. When the duration of the first clog detection signal VIRUS-1 exceeds a certain time within a range of 0.1 sec to 0.2 sec, the counter 78 produces a high-level pulse shown in FIG. 13(E), and supplies this high-level pulse to a latch circuit 80 as a latch pulse.

The latch circuit 80 latches a power source voltage +B from a power source terminal 81, responsive to a rising point of the latch pulse received from the counter 78, and produces a high-level second clog detection signal VIRUS-2 shown in FIG. 13(F). This second clog detection signal VIRUS-2 is supplied to the main CPU 19 shown in FIG. 1, through an output terminal 82. The main CPU 19 measures the time (indicated by the time address recorded on the disc) when the second clog detection signal VIRUS-2 was generated, the time when the signal VIRUS-2 terminated, and the duration of the signal VIRUS-2. When the main CPU 19 receives the second clog detection signal VIRUS-2 and completes the measuring operations, the main CPU 19 produces a reset signal shown in FIG. 13(G) and supplies this reset signal to a reset terminal R of the latch circuit 80 through an input terminal 83 shown in FIG. 12, so as to cancel the generation of the second clog detection signal VIRUS-2. Further, the main CPU 19 stores the measured values of the time when the second clog detection signal VIRUS-2 was generated, the time when the signal VIRUS-2 terminated, and the duration of the signal VIRUS-2.

By comparing the duration of the dropout with a constant duration in the manner described heretofore, it is possible to discriminate whether the dropout is generated by a cause such as a deformation or a scratch on the disc, or a cause such as clog on the disc or on the reproducing stylus. The dropout generated by the first cause is permanent, while the dropout generated by the latter cause is not permanent. When it is detected that the generated dropout is caused by the first cause, it is possible to check the stamper, the original disc, or the like so as to locate and eliminate the cause of the dropouts. For this reason, the generation of defects on the discs may be reduced, and the percentage of manufacturing acceptable (satisfactory) discs as opposed to defective discs may be improved.

Returning to the description of the circuit system shown in FIG. 1, the dropout detection signal DO and the first clog detection signal VIRUS-1 are respectively supplied to the gate circuit 21. The gate circuit 21 supplies the dropout detection signal DO to the main CPU 19 only in a duration in which the first clog detection signal VIRUS-1 does not exist, that is, only while the first clog detection signal VIRUS-1 assumes a low level.

The reproduced color video signal VI and the reproduced vertical synchronizing signal VS from the reproducing apparatus 10, are respectively supplied to the address get circuit 17. The address get circuit 17 detects and reproduces a time address signal, for example, from among a chapter address signal, the time address signal, and a track number address signal which are multiplexed within a predetermined duration within the vertical blanking period of the reproduced color video signal. As disclosed in a U.S. patent application Ser. No. 433,872 filed Oct. 13, 1982 in which the assignee is the same as the assignee of the present application, for example, the chapter address signal indicates the recorded position of the signal in terms of the order (number) of the recorded program. The time address signal indicates the recorded position of the signal in terms of the reproducing time. Further, the track number address signal indicates the number of track turns by assuming that one track turn is obtained when the disc undergoes one revolution with the recorded position of the reference signal fp3 as the starting point. The chapter address signal, the time address signal, and the track number address signal are each made up of 29 bits.

A time address signal AD which is detected and reproduced in the address get circuit 17, is supplied to the sub CPU 18 which is provided exclusively for processing the address information. The sub CPU 18 also receives the reproduced reference signal Fp3 and the video muting signal VM. In a case where it is possible to obtain a reproduced time address from an address get circuit within the reproducing apparatus 10, the address get circuit 17 may be omitted.

The time address signal AD which is detected and reproduced in the address get circuit 17, may be detected as an erroneous data when noise is superimposed on the time address signal due to a dropout or the like. In this case, an erroneous operation will be performed during the detection and discrimination of the tracking error which will be described later on in the specification. Accordingly, the sub CPU 18 discriminates whether the data in the reproduced time address signal AD is correct and corrects the data when the data is incorrect, before supplying the reproduced time address signal AD to the main CPU 19. In other words, the sub CPU 18 checks the pattern of the framing code in the first four bits of the 29-bit reproduced time address signal AD, and performs a parity check by use of the last bit of the 29-bit signal AD. In this case, the data in the reproduced time address signal AD will be detected as being correct when the framing code is correct and two of the remaining 25 bits are in error, for example, even when the above checking operations are performed. For this reason, since the three kinds of address signals are recorded at four locations in one track turn of the disc, the sub CPU 18 stores all of the time address signals AD which are successively reproduced from the four locations during one revolution of the disc, and discriminates whether the data in the reproduced time address signal AD is correct, based on a reproduction speed command signal from an operating panel 22.

In the case of a normal reproduction in which the motion in the picture is the same as the motion in the picture at the time of the recording, it is discriminated that the data in the reproduced time address signal AD is correct when the values of three or more data reproduced during one revolution of the disc are identical. This is because the values of the data in the time address signals AD which are recorded within each of the four positions where the vertical blanking periods are recorded in one track turn, are identical. When two data in the reproduced time address signals AD are identical but are different from the other two data in the reproduced time address AD which are reproduced from the same track turn, the two data which are identical are discriminated as being the correct data. On the other hand, the four data in the reproduced time address signals AD which are reproduced from the same track turn, may all be different. In this case, the sub CPU 18 produces an artificial time address signal which is formed by adding an address data corresponding to one track turn to the data of the time address signal which was reproduced from the previous one track turn.

In the case of a quintuple-speed reproduction, the reproducing stylus 31 is kicked by one track pitch in the forward direction (inner peripheral direction of the disc) every time the reproducing stylus 31 scans over one of the four recorded parts where the vertical blanking periods are recorded, as is well known. In other words, the reproducing stylus 31 is advanced by five track turns during one revolution of the disc. Hence the data in the four reproduced time address signals AD which are reproduced during one revolution of the disc, is successively increased by an address data corresponding to one track turn. Accordingly, the sub CPU 18 successively compares differences between two successively reproduced time address signals AD, and discriminates whether the differences coincide. When the differences do not coincide and there is no continuity between two successively reproduced time address signals AD, the sub CPU 18 forms an artificial time address signal from the time address signal which was reproduced during the previous revolution of the disc, as in the case described before for the normal reproduction. The sub CPU 18 discriminates the continuity in the successively reproduced time address signals AD by noting the regular increase in the address data. Hence, all of the errors in the data which occur singularly in the reproduced time address signals AD, can be eliminated in the sub CPU 18.

The reproduced reference signal Fp3, the video muting signal VM, and the status signal ST from the reproducing apparatus 10, are supplied to the main CPU 19. The main CPU 19 also receives the dropout detection signal DO from the gate circuit 21, the angle detection signals ANG-1 through ANG-3 from the dropout generation angle detecting circuit 15, the second clog detection signal VIRUS-2 from the clog detecting circuit 16, the reproduced time address signal AD from the sub CPU 18, and an operation signal from the operating panel 22. The main CPU 19 carries out the operations which will be described in conjunction with the flow chart shown in FIG. 14.

FIG. 14 is the flow chart showing the main program of the main CPU 19. When the power of the main CPU 19 is turned ON, initialization is carried out in a step 90. A step 91 reads the operation signal from the operating panel 22, and discriminates whether a start button on the operating panel 22 is ON. When the discrimination result in the step 91 is YES, a control signal for carrying out a reproduction is generated in a step 92. For example, in a case where a quintuple-speed button and the start button on the operating panel 22 are ON, the discrimination result in the step 91 is YES, and a control signal for carrying out a quintuple-speed forward reproduction is generated in the step 92. The control signal generated in the step 92, is supplied to a remote control interface circuit 23 from the main CPU 19. The control signal is converted into a remote control signal in the interface circuit 23, and is supplied to the reproducing apparatus 10 through a remote control transmitter 24. The reproducing apparatus 10 starts a quintuple-speed forward reproduction responsive to the remote control signal from the remote control transmitter 24. In the case of the quintuple-speed forward reproduction, the reproducing stylus 31 is moved in the inner peripheral direction of the disc 30 by five track pitches in one revolution of the disc 30. However, the reproducing stylus 31 of the reproducing apparatus 10 which is used for the inspection, has a width of approximately 7 μm in the radial direction of the disc 30. Accordingly, the defects within the five track pitches will always be scanned by the reproducing stylus 31. Because the reproducing speed is set to the quintuple-speed, the time it takes to play and inspect a disc is reduced to 1/5 when compared to the case where the disc is played under the normal reproduction. Both recording sides of the disc may be played and inspected in approximately twenty minutes. It is of course possible to set the reproducing apparatus 10 to the normal reproduction mode by appropriately operating the operating panel 22.

After the reproduction is started, the video muting signal VM assumes a high level while the reproducing stylus 31 scans over the lead-in section on the disc 30. Thus, in this state, the main CPU 19 sequentially carries out steps 93 and 94 repeatedly. When the reproducing stylus 31 thereafter begins to scan over the program recorded section on the disc 30, the video muting signal VM assumes a low level, and the operation advances to a step 95. The step 95 carries out operations with respect to the address signal AD, based on the reproducing speed which is instructed by the operation signal from the operating panel 22, and detects the tracking error. In the case of the quintuple-speed forward reproduction, the value of the reproduced time address signal AD should increase by a constant value, proportionally to real time. Accordingly, in the step 95, the main CPU 19 detects the change in the time of the reproduced time address signal AD and the increase in real time, for every revolution of the disc 30. When the time difference between the reproduced time address signals AD reproduced during two successive revolutions of the disc 30, does not correspond to the difference in real time between first of the two successive revolutions and the latter revolution, the step 95 discriminates that a tracking error has occurred. Moreover, the main CPU 19 stores the value of the reproduced time address signal AD reproduced during the first of the two successive revolutions of the disc 30, as the starting time of the tracking error.

A step 96 is carried out subsequent to the step 95, so as to carry out a clog detecting process. The step 96 discriminates the existence of the second clog detection signal VIRUS-2. The time when the second clog detection signal VIRUS-2 is generated which is described by the reproduced time address signal AD, and the duration of the signal VIRUS-2, are stored in the main CPU 19 when a high-level second clog detection signal VIRUS-2 exists. A step 97 carries out a dropout detecting process. The time when the dropout is generated which is described by the reproduced time address signal AD, the angle detection signals ANG-1 through ANG-3, and the duration of the dropout are stored in the main CPU 19. The steps 93 through 97 are carried out repeatedly unless a stop button is pushed while the reproducing stylus 31 scans over the program recorded section on the disc 30. While the steps 93 through 97 are carried out, the main CPU 19 supplies a display signal to an indicator 25, so as to display the address on the disc 30 where the reproducing stylus 31 is presently located, the existence of a clog, the existence of a dropout, and the number of times a defect such as a dropout or a clog is detected. The reproducing stylus 31 then scans over the lead-out section on the disc 30. When the stop button on the operating panel 22 is pushed, the main CPU 19 generates a control signal so as to terminate the reproducing operation of the reproducing apparatus 10, and a step 98 carries out a printing process. Information related to the defects such as the tracking error, the clog, the dropout or the like which are detected in the steps 95 through 97, and the information related to the reproducing apparatus 10 such as the reproducing speed, the starting and ending times of the reproduction or the like, are supplied to a printer 26 from the main CPU 19. As a result, the reproducing speed, the starting and ending addresses of the reproduction, the number of defects, the address where the tracking error occurred, the address where the clog was generated, the duration of the clog, the address where the dropout was generated, the angular range on the disc where the dropout was generated, the duration of the dropout, or the like, are respectively printed in the form of a list in the printer 26. The program shown in FIG. 14 is hence ended.

Figure 15:
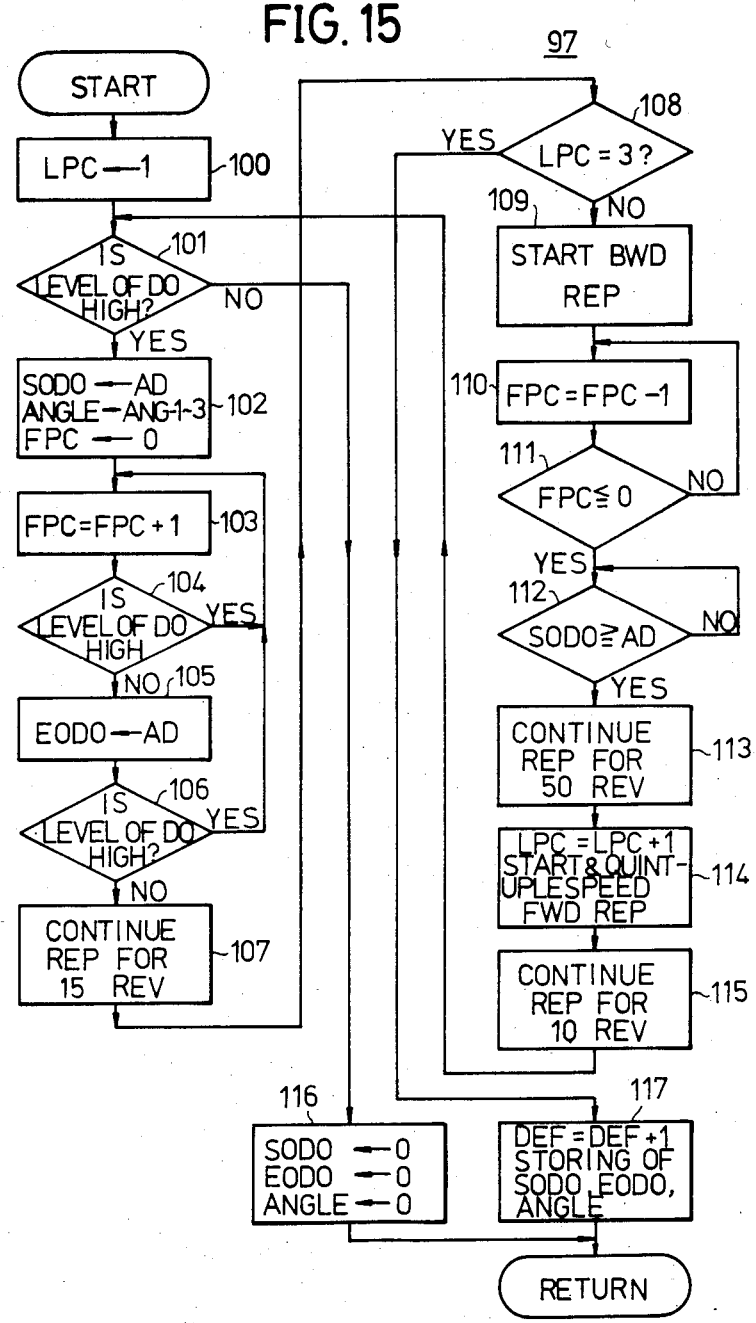
FIG. 15 is a flow chart for explaining an essential part of the flow chart shown in FIG. 14 in more detail.

Next, a more detailed description will be given with respect to the dropout detecting process which is carried out in the step 97 shown in FIG. 14. FIG. 15 is a flow chart showing a subroutine program which is executed in the step 97. When the execution of this subroutine program is started, a step 100 sets a variable LPC to "1", where the variable LPC indicates the counted value of the loop. A step 101 discriminates whether the level of the dropout detection signal DO is high. When the discrimination result in the step 101 is YES, a step 102 carries out the following. That is, a variable SODO which indicates the starting position of the dropout, is set to the value of the reproduced time address signal AD. In addition, a variable ANGLE is set to the value of the angle detection signals ANG-1 through ANG-3 which amount to three bits. Furthermore, a variable FPC which counts the reproduced reference signal Fp3, is set to "0". When the reproduced reference signal Fp3 is obtained thereafter, a step 103 increments (counts up) the variable FPC by one. A step 104 discriminates the level of the dropout detection signal DO for the second time. The operation is returned to the step 103 when a dropout exists, and the duration of the dropout is counted in terms of the number of rotations of the disc 30. In this state, the reproducing apparatus 10 is in the quintuple-speed forward reproduction mode, and the number of tracks in which the the dropout occurred is equal to five times the value of the variable FPC.

When the dropout no longer exists, a step 105 sets a variable EODO which indicates the ending position of the dropout to the value of the reproduced time address signal AD. In addition, a step 106 discriminates whether the level of the dropout detection signal DO is high. When there is a dropout and the discrimination result in the step 106 is YES, the operation is returned to the step 103. In other words, when the dropout is not detected for one revolution of the disc although dropouts are detected during preceding and subsequent revolutions of the disc, it is detected as if the dropout existed continuously, so as to prevent a so-called chattering, that is, to prevent discontinuous detection of dropouts. When the discrimination result in the step 106 is NO and it is detected that no dropout exists, a step 107 continues the quintuple-speed forward reproduction for fifteen revolutions of the disc by counting the reproduced reference signal Fp3. In other words, in the case of a disc from which the dropout is detected within an interval indicated by hatchings in FIG. 16(A), between the time when the variable SODO is set and the time when the variable EODO is set, the reproducing stylus 31 scans up to a track turn which exceeds the track turn which is indicated by the variable EODO by 75 track turns.

A step 108 discriminates the number of loops from the value of the variable LPC, and a step 109 is carried out when the number of loops is less than or equal to three. The main CPU 19 generates a control signal for carrying out a normal backward reproduction in the step 109, and the reproducing apparatus 10 accordingly starts the normal backward reproduction. The stylus pressure during the normal backward reproduction, is set in the range of 1.5 times the stylus pressure at the time of the normal forward reproduction. The stylus pressure is increased during the normal backward reproduction, because the deformed convex protions which are the major causes for the dropouts, can be effectively scraped off by the reproducing stylus 31. As a result, most of the deformed convex portions are scraped off by the reproducing stylus 31 as the reproducing stylus 31 moves backwardly. The main CPU 19 continues to decrement (count down) the value of the variable FPC until the variable FPC becomes zero, in steps 110 and 111, responsive to the reproduced reference signal Fp3 which is obtained for every revolution of the disc 30. Further, a step 112 compares the variable SODO with the reproduced time address signal AD, and a step 113 is carried out when the value of the reproduced time address signal AD becomes smaller than the value of the variable SODO. The reproducing stylus 31 is returned to a track turn which is fifty track turns before the starting position of the dropout. Because a tracking error easily occurs in the track part where the dropout is generated, the time address signal AD is used to determine whether a track turn before the starting position of the dropout is being reproduced.

Next, the main CPU 19 increments (counts up) the value of the variable LPC by "1" in a step 114, and produces a control signal for carrying out a quintuple-speed forward reproduction. As a result, the reproducing apparatus 10 carries out the quintuple-speed forward reproduction for ten revolutions of the disc 30 in a step 115, and moves the reproducing stylus 31 to the starting position of the previously detected dropout. Thereafter, the discrimination is the step 101 is carried out to determine whether the defect due to the deformed convex portion has been eliminated. When the deformed convex portion has been scraped off and the dropout does not occur, the operation advances to a step 116 where the variables SODO, EODO, and ANGLE are respectively cleared, and the dropout detecting process is completed.

On the other hand, when the dropout is again detected in the step 101, the steps 102 through 115 are carried out again. After these sequence of operations, the discrimination is again made in the step 101. When the dropout is again detected, the steps 102 through 107 are carried out, and the operation advances to a step 117 from the step 108. In this case, it is definitely discriminated that there is a defect. Only the variable DEF which counts the number of defects, is incremented (counted up) by "1" in the step 117. Further, the variables SODO, EODO, and ANGLE are independently stored, and the dropout detecting process is completed. The operation of the main CPU 19 is returned to the main routine shown in FIG. 14.

The dropout detecting process carried out in the step 97 which is shown in FIG. 15, will now be described in conjunction with FIGS. 16(A) through 16(C). In the case described heretofore, the disc which is to be inspected contains an interval 120 in which the dropout is generated. This interval 120 exists between the track turn having the time address stored for the variable SODO and the track turn having the time address stored for the variable EODO. The inspecting device 11 carries out the inspection, by causing the reproducing apparatus 10 to first carry out a quintuple-speed forward reproduction, as indicated by X5 in FIGS. 6(B) and 6(C). After the reproducing stylus 31 slightly exceeds the interval 120, the reproducing apparatus 10 carries out a normal backward reproduction up to a position which exceeds the starting position of the interval 120, as indicated by X-1 in FIGS. 6(B) and 6(C). Thereafter, the reproducing apparatus 10 carries out a quintuple-speed forward reproduction for the second time, as indicated by X5 in FIGS. 6(B) and 6(C). This sequence of operations completes one loop. When the deformed convex portion is scraped off by the reproducing stylus 31 during this one loop, it is detected from the reproduced time address signal AD that the reproducing stylus 31 has exceeded the interval 120, and the reproducing apparatus 10 resumes the normal reproduction as shown in FIG. 6(C). However, when the deformed convex portion is not scraped off by the reproducing stylus 31 during this one loop, a second loop is performed as shown in FIG. 16(B). When the deformed convex portion is scraped off by the reproducing stylus 31 during the second loop, the reproducing apparatus 10 resumes the normal reproduction as shown in FIG. 6(B) after the value of the variable EODO is checked. The reproducing apparatus 10 detects that the disc contains a defect when the dropout still occurs during the second loop. As a result, 55% of the discs which were detected as defective discs according to the conventional defect detecting method, can be detected as acceptable discs. Further, 99% of the discs which are detected as defective discs from the count of the variable DEF in the step 117, are completely defective discs which cannot be cured by scraping off the deformed convex portion. Therefore, the reliability of the detect detecting operation in the present invention is considerably improved over the conventional defect detecting method.

According to the defect detecting apparatus of the present invention, the inspector simply needs to check the display on the indicator 25 or the print-out from the printer 26, while the disc is being played or after the disc has been played. Hence, one inspector can simultaneously inspect ten or more discs.

The detect detecting apparatus according to the present invention is not limited to the application to the electrostatic capacitance type disc, but is also applicable to an optical type disc from which the pre-recorded information signals are read out optically. In the case of the optical type disc, however, the processes in the step 97 described in conjunction with FIG. 15, excluding the process of scraping off the deformed convex portion, are carried out together with the tracking error detecting process of the step 95 and the clog detecting process of the step 96.

Further, the present invention is not limited to these embodiments, but various variations and modifications may be made without departing from the scope of the present invention.

What is claimed is:

1. A defect detecting apparatus for detecting defects of a rotary recording medium based on various signals received from a reproducing apparatus which plays the rotary recording medium, said rotary recording medium having a frequency modulated multiplexed signal pre-recorded on a spiral track or concentric tracks thereof, said frequency modulated multiplexed signal being a multiplexed signal which has an address signal indicative of track positions multiplexed to information signals at least including a composite video signal, and which has been subjected to a frequency modulation, said defect detecting apparatus comprising:

a first dropout selecting circuit supplied with a dropout detection signal which is produced from said reproducing apparatus when a decrease in the amplitude of a signal reproduced from the rotary recording medium is detected in said reproducing apparatus, for producing a first dropout detection signal having a predetermined pulse width responsive to one or a plurality of the dropout detection signals which are received from said reproducing apparatus during a predetermined duration in which a plurality of dropouts may be visually considered as being one dropout;

a second dropout selecting circuit supplied with the dropout detection signal and a reproduced vertical synchronizing signal from said reproducing apparatus, for producing a second dropout detection signal responsive to the dropout detection signal which is received from said reproducing apparatus with a phase which is at least in a vicinity of a beginning of the reproduced vertical synchronizing signal;

an angle detecting circuit supplied with a reference signal which is reproduced by said reproducing apparatus with a period of one track turn and the first and second dropout detection signals received from the respective first and second dropout selecting circuits, for generating an angle detection signal indicative of angular positions on the rotary recording medium where the first and second dropout detection signals are generated with respect to a reference position which is related to the reference signal;

a clog detecting circuit supplied with the frequency modulated multiplexed signal which is reproduced from the rotary recording medium in said reproducing apparatus and a clock signal having a constant frequency, for detecting at least a dropout which is caused by a clog on the rotary recording medium and has a duration of over a predetermined duration, and for generating a clog detection signal having a duration corresponding to the detected dropout;

compensating means for compensating a value of the address signal which is detected and reproduced from the frequency modulated multiplexed signal which is reproduced from the rotary recording medium in said reproducing apparatus, by comparing the value of the address signal which is detected and reproduced with a value of the address signal which was previously detected and reproduced;

processing means for sequentially performing a first process in which the existence of a tracking error is discriminated by comparing the value of the reproduced address signal from said compensating means and real time, a second process in which the existence of a clog is discriminated responsive to the clog detection signal from said clog detecting circuit, and a third process in which at least the existence of an interval in which a dropout is generated is discriminated based on the angle detection signal from said angle detecting circuit and the first and second dropout detection signals from the respective first and second dropout selecting circuits; and at least an output device for storing or displaying a result of the processing in said processing means.

2. A defect detecting apparatus as claimed in claim 1 in which said first dropout selecting circuit comprises a first input terminal for receiving the dropout detection signal from said reproducing apparatus, a second input terminal for receiving a kick pulse which is generated from said reproducing apparatus when forcibly changing a reproducing track position on the rotary recording medium, a gate circuit for selectively passing the dropout detection signal received through said first input terminal in a duration in which the kick pulse from said second input terminal does not exist, a charging and discharging circuit for performing a charging operation in a duration in which the dropout detection signal is produced from said gate circuit, and for performing a discharging operation in a duration in which the dropout detection signal is not produced from said gate circuit, and comparing means for comparing levels of an output signal of said charging and discharging circuit and a reference signal, and for producing the first dropout detection signal responsive to the level comparison, and said charging and discharging circuit has a discharging time constant related to said predetermined duration in which one or a plurality of dropouts may be visually considered as one dropout.

3. A defect detecting apparatus as claimed in claim 1 in which said second dropout selecting circuit comprises a first input terminal for receiving the dropout detection signal from said reproducing apparatus, a second input terminal for receiving a kick pulse which is generated from said reproducing apparatus when forcibly changing a reproducing track position on the rotary recording medium, a third input terminal for receiving a vertical synchronizing signal which is reproduced from the rotary recording medium in said reproducing apparatus, a first gate circuit for selectively passing the dropout detection signal received through said first input terminal in a duration in which the kick pulse from said second input terminal does not exist, a pulse generating circuit triggered responsive to a leading edge of the reproduced vertical synchronizing signal received through said third input terminal, for generating a pulse having a small pulse width, a gate pulse generating circuit for generating a gate pulse having a predetermined width including the leading edge of the reproduced vertical synchronizing signal, only when the dropout detection signal from said first gate circuit has a duration of over a specific value, a second gate circuit for passing the output pulse of said pulse generating circuit only in a duration in which the gate pulse is received from said gate pulse generating circuit, and a circuit triggered responsive to an output pulse of said second gate circuit, for generating the second dropout detection signal having a predetermined pulse width.

4. A defect detecting apparatus as claimed in claim 1 in which said rotary recording medium has the information signals recorded thereon as variations in geometrical configuration, said reproducing apparatus reproduces the pre-recorded signals from the rotary recording medium by detecting variations in electrostatic capacitance which is formed between the rotary recording medium and an electrode of a reproducing stylus which scans over the tracks on the rotary recording medium, said processing means at least receives the first and second dropout detection signals, a signal indicating that the reproducing stylus of said reproducing apparatus is scanning over a program recorded section on the rotary recording medium, a signal indicative of a reproducing speed and a reproducing direction of said reproducing apparatus, and the address signal from said compensating means, and said processing means performs a predetermined sequence of processes, said predetermined sequence of processes including a process of storing addresses of starting and ending positions of an interval on the rotary recording medium where the first or second dropout detection signal is generated when the interval is reproduced for the first time, a process of causing said reproducing apparatus to carry out a backward reproduction with respect to the interval and thereafter carry out a forward reproduction with respect to the interval for the second time while detecting the existence of the first or second dropout detection signal, a process of causing said reproducing apparatus to carry out a backward reproduction with respect to the interval for the second time and then carry out a forward reproduction with respect to the interval for the third time when at least one of the first and second dropout detection signals is detected during the forward reproduction of the interval for the second time, and a process of discriminating that the rotary recording medium contains a defect when at least one of the first and second dropout detection signals is detected during the reproduction of the interval for the third time.

5. A defect detecting apparatus as claimed in claim 4 in which said processing means produces during the backward reproduction a first control signal for causing said reproducing apparatus to carry out the normal-speed backward reproduction with a stylus pressure greater than the stylus pressure employed at the time of the forward reproduction, and produces during the forward reproduction a second control signal for forcibly causing said reproducing stylus to move by one track pitch in the forward direction at each of a plurality of recorded parts in one track turn where vertical blanking periods are recorded.

6. A defect detecting apparatus as claimed in claim 1 in which said compensating means comprises a central processing unit supplied with a time address signal which is obtained from the signals which are reproduced from the rotary recording medium in said reproducing apparatus, said central processing unit performs a first process of comparing values of the, time address signals which are successively reproduced from one track turn on the rotary recording medium and a second process of detecting a change in the regularity of values compared in the first process, and said second process discriminates that the time address signal is correct and produces the same time address signal when the values compared in the first process undergo a regular change, and produces an artificial time address signal which is formed based on a time address signal which was reproduced during a previous revolution of the rotary recording medium when the values compared in the first process do not undergo a regular change.

* * * * *